(12) United States Patent
Thiebot et al.

(10) Patent No.: US 8,508,337 B2
(45) Date of Patent: Aug. 13, 2013

(54) METHOD OF VALIDATING A BIOMETRIC CAPTURE, NOTABLY A BODY PRINT

(75) Inventors: Alain Thiebot, Paris (FR); Joël-Yann Fourre, Paris (FR); Laurent Lambert, Paris (FR)

(73) Assignee: Morpho, Paris (FR)

( * ) Notice: Subject to any disclaimer, the term of this patent is extended or adjusted under 35 U.S.C. 154(b) by 1040 days.

(21) Appl. No.: 12/446,725

(22) PCT Filed: Oct. 25, 2007

(86) PCT No.: PCT/FR2007/052243
§ 371 (c)(1),
(2), (4) Date: Apr. 22, 2009

(87) PCT Pub. No.: WO2008/050070
PCT Pub. Date: May 2, 2008

(65) Prior Publication Data
US 2010/0034433 A1  Feb. 11, 2010

(30) Foreign Application Priority Data
Oct. 25, 2006 (FR) ..................... 06 09378

(51) Int. Cl.
*G06F 7/04* (2006.01)
(52) U.S. Cl.
USPC ......... 340/5.82; 340/5.52; 382/115; 382/124; 356/445
(58) Field of Classification Search
USPC ............. 340/5.52, 5.53, 1.1, 5.1, 5.2, 5.51, 340/5.82, 5.84; 382/124, 115; 348/77; 356/445
See application file for complete search history.

(56) References Cited

U.S. PATENT DOCUMENTS

| 4,167,331 A | 9/1979 | Nielsen |
| 4,500,784 A | 2/1985 | Hacskaylo |

(Continued)

FOREIGN PATENT DOCUMENTS

| FR | 2 849 244 A1 | 6/2004 |
| FR | 2 849 246 A1 | 6/2004 |
| WO | WO 9928701 | 6/1999 |
| WO | WO 0159733 A2 | 8/2001 |

OTHER PUBLICATIONS

Search Report from related Chinese Application No. 200780047911.2; report dated Oct. 26, 2011.

(Continued)

*Primary Examiner* — Brian Zimmerman
*Assistant Examiner* — Sara Samson
(74) *Attorney, Agent, or Firm* — Miller, Matthias & Hull LLP

(57) ABSTRACT

The invention relates to a method for validating a biometrical acquisition, mainly the acquisition of a body imprint of a body area such as fingerprints or a face imprint, wherein the method involves together with the biometric acquisition: lighting the body area using at least one radiation having at least two respective different wavelengths between approximately 500 nm and 1150 nm; taking at least two reflectometry measurements concerning said and at least two wavelengths for measuring the reflection index of the tissues for these wavelengths; calculating the ratio for two measured indices; and comparing the ratio with a range of reference values characterizing a haemoglobin-containing living tissue in terms of proportions of oxygenated and non-oxygenated forms characteristic of the living states for the wavelengths in question; if the ratio is included in said range, the body area is considered as living and the biometrical acquisition is validated; and conversely, if the body area is considered as not living, the biometrical acquisition cannot be validated.

26 Claims, 5 Drawing Sheets

(56) References Cited

U.S. PATENT DOCUMENTS

| | | | | |
|---|---|---|---|---|
| 5,719,950 | A | * | 2/1998 | Osten et al. .................. 382/115 |
| 5,737,439 | A | | 4/1998 | Lapsley et al. |
| 6,400,972 | B1 | * | 6/2002 | Fine ............................... 600/322 |
| 7,522,750 | B2 | * | 4/2009 | Chiang et al. ................. 382/115 |
| 7,567,690 | B2 | | 7/2009 | Foundeur et al. |
| 2002/0086432 | A1 | * | 7/2002 | Tam et al. ........................ 436/66 |
| 2003/0009090 | A1 | * | 1/2003 | Jeon et al. ...................... 600/323 |
| 2005/0265585 | A1 | * | 12/2005 | Rowe ............................. 382/124 |
| 2006/0159314 | A1 | | 7/2006 | Foundeur et al. |
| 2007/0106160 | A1 | | 5/2007 | Kilgore et al. |

OTHER PUBLICATIONS

W.G. Zijlstra, A. Buursma, O.W. Van Assendelft, "Visible and Near Infrared Absorption Spectra of Human and Animal Haemoglobin" 2000, VSP, Utrecht, XP002480429.

Preliminary Search Report dated Mar. 27, 2007 corresponding to the priority application FR 06 09378.

International Preliminary Search Report on Patentability dated May 27, 2008 corresponding to PCT/FR2007/052243.

* cited by examiner

METHOD OF VALIDATING A BIOMETRIC CAPTURE, NOTABLY A BODY PRINT

CROSS-REFERENCE TO RELATED APPLICATIONS

This application is a U.S. national stage filing of International Patent Application No. PCT/FR2007/052243 filed on Oct. 25, 2007, which claims priority under the Paris Convention to French Patent Application No. 06 09378, filed on Oct. 25, 2006.

FIELD OF THE DISCLOSURE

The present invention relates generally to the field of biometric capture, in particular of body imprints of an area of the body, notably a fingerprint or face print, on an individual, for example in order to identify or authenticate an individual, and more specifically it relates to refinements made in this field.

BACKGROUND OF THE DISCLOSURE

Fraud when it comes to body print capture, notably, commonly, fingerprint capture, can, according to one of its aspects, consist of the so-called "false finger" technique: the defrauder uses a false finger (or a false area of the body) reproducing the body print characterizing an individual. This false finger can, for example, consist of an imitation of a complete finger (or of an area of the body) provided with a reproduction of the body print to be detected to characterize a given individual, or simply, concerning the capture of a fingerprint, this false finger can consist of a finger stall, provided externally with a reproduction of the fingerprint of the individual, with which the falsifier clads his own finger.

These false fingers, which can certainly offer the formal appearance of the appropriate body print, do not, however, have all the electrical or chemical characteristics of a living finger. It is therefore known to identify the living character of an area of the body from which a fingerprint is to be taken by performing appropriate electrical measurements when said area of the body is applied to a fingerprint capture device. For example, it can be an electrical resistance measurement as taught in documents FR 2 849 244 and FR 2 849 246, both in the name of the Applicant.

However, it is not possible to exclude the fact that the fraud can take place with the proper body area of the individual that the defrauder would have previously amputated (in particular, cutting off a finger of the individual that the defrauder then applies to the fingerprint capture device). There is therefore a need, to avoid this fraud method, to verify the living nature of the area of the body placed in cooperation with the fingerprint capture device.

However, the existing control methods often prove ill suited to this precise case of fraud because a body area that has been amputated loses the physical characteristics measured by these methods only after a certain time period, sufficiently long to allow a defrauder the time to amputate an area of the body of the individual, then go to the print capture device to use thereon the area of the body amputated.

To overcome these constraining drawbacks, it therefore appears advantageous to address the living character of the body area on which the biometric capture must be performed, and this living character is reflected in the proportion of oxygenated hemoglobin relative to the proportion of non-oxygenated hemoglobin of said body area. Such a solution is of particular interest, because this ratio [oxygenated hemoglobin/non-oxygenated hemoglobin] remains approximately constant as long as the tissues are living, but decreases very rapidly immediately the tissues cease to be living (case of a body area amputated, such as a finger that has been amputated for example) or are traumatized with the blood circulation stopped or significantly reduced (case of a finger or an arm fitted with a tourniquet, for example); typically, the hemoglobin oxygenation/deoxygenation ratio has already strongly decreased from the first minute at the end of which the oxygenation is no longer renewed because the cells do not die instantaneously and finish consuming the oxygen locally present (case of a body area that has been amputated or immediately the heart is stopped for example). However, it is improbable that the defrauder will amputate the body area in the same place where the print capture must be performed and in practice, between the moment when the body area is amputated and its use for the purposes of print capture, a time interval will elapse which, even if it is not very long (for example a few minutes, and a fortiori if it is several hours, even several days), will be sufficient for the oxygenation ratio of the hemoglobin to have decreased to a value very much lower than the living value. From this point of view, such a method proves more efficient than most of those used to date.

Of course, it is already known, in the medical field, to proceed with light transmission measurements at several wavelengths on one position of the body of an individual in order to deduce therefrom, in conjunction with a pulse measurement, the oxygenation rate of the arterial blood (in this case, only the pulsed arterial part in pace with the pulse is extracted to eliminate the influence of the pigments, of the bones and of the dark blood). This quantity is represented by the amount of oxygenated hemoglobin relative to the total hemoglobin present. It is used, for example, to detect drops in oxygenation during sleep apnea. This is a measurement process that is slow, notably because of the long time needed to carry out the measurement of the pulse, but it does lead to accurate information concerning the oxygenation rate of the arterial blood.

However, it is essential to consider that such precise information on the oxygenation rate of the arterial blood, while it can indeed be exploited in the context of a biometric identification of an individual targeted by the invention, would be excessive, because the precision of the information to which it would lead is not necessary to arrive at the biometric information sought; furthermore, the acquisition time for the useful information would be much too long and implementation relatively complex (modulation of the incident light, numerous processing operations to extract the pulsed information and spurious information), such that this known solution cannot be retained to implement a fast and economical process of biometric identification. Also, optical analysis in transmission mode is not suited to the usual format of the biometric sensors currently used.

It is essential to understand that, in the context of the invention, it is enough, to achieve the required result, to have information, however partial (by comparison to the absolute measurement performed in the medical field), that is simply representative of the imperative presence and of the relative equilibrium of oxygenated and non-oxygenated hemoglobin in proportions compatible with the living character in the object (real, falsified or false body area) being examined, without it being necessary or simply useful either to know the precise value of the oxygenation rate as defined in the medical environment, or be limited specifically to the arterial or pulsed blood.

SUMMARY OF THE DISCLOSURE

It is in this context that the invention proposes a method of validating biometric capture, in particular body print capture from an area of the body, in particular a fingerprint, of an individual, which is characterized, according to the invention, in that in the area of the body provided with the biometric characteristic to be detected, in parallel with the biometric capture proper:

said area of the body is illuminated using at least one radiation including at least two different respective wavelengths between about 500 nm and 1150 nm, at least two reflectometry measurements are carried out in relation to said at least two different respective wavelengths between about 500 nm and 1150 nm, so as to measure the reflection rate of the tissues of said body area for said at least two wavelengths, the ratio of these two measured rates is calculated, and the duly calculated ratio is compared with an interval of reference values of the proportion of oxygenated hemoglobin relative to the deoxygenated hemoglobin characterizing a living tissue for the wavelengths concerned.

After which, if said ratio is within said interval, said area of the body is considered to be living and the biometric capture can be validated, or even, if said ratio is not within said interval, said area of the body is considered not to be living and the biometric capture may not be validated.

The range of wavelengths from 500 to 1150 nm corresponds to the area for which the absorption differences between oxygenated and non-oxygenated hemoglobin remain easily measurable despite the presence of disturbances common to both measurements like the bones and the pigments of the skin.

The method according to the invention is simple and quick to implement, it does not require the use of complex and costly hardware, and it is capable of providing the required information within a time period (less than a second) that is compatible with an individual identification process.

Furthermore, this method can give rise to various possibilities and variant implementations that allow for easy adaptation to various constraints. In particular, in a first implementation, it is possible to provide for said area of the body to be illuminated using at least two radiations including said at least two different respective wavelengths and for at least two reflectometry measurements in relation to said at least two different respective wavelengths to be carried out to measure the reflection rate of the tissues of said body area for said at least two wavelengths. In a second implementation, it is possible, on the other hand, to provide for said area of the body to be illuminated using a radiation including said at least two different respective wavelengths, for the at least two reflected radiations having said at least two wavelengths to be filtered from the reflected radiation, and for at least two reflectometry measurements aligned on said at least two different respective wavelengths to be carried out to measure the reflection rate of the tissues of said body area for said at least two wavelengths.

BRIEF DESCRIPTION OF THE DRAWINGS

The invention will be better understood on reading the detailed description that follows of certain preferred implementations, given solely by way of nonlimiting examples. In this description, reference is made to the appended drawings in which.

DETAILED DESCRIPTION OF THE DISCLOSURE

Figure 1:
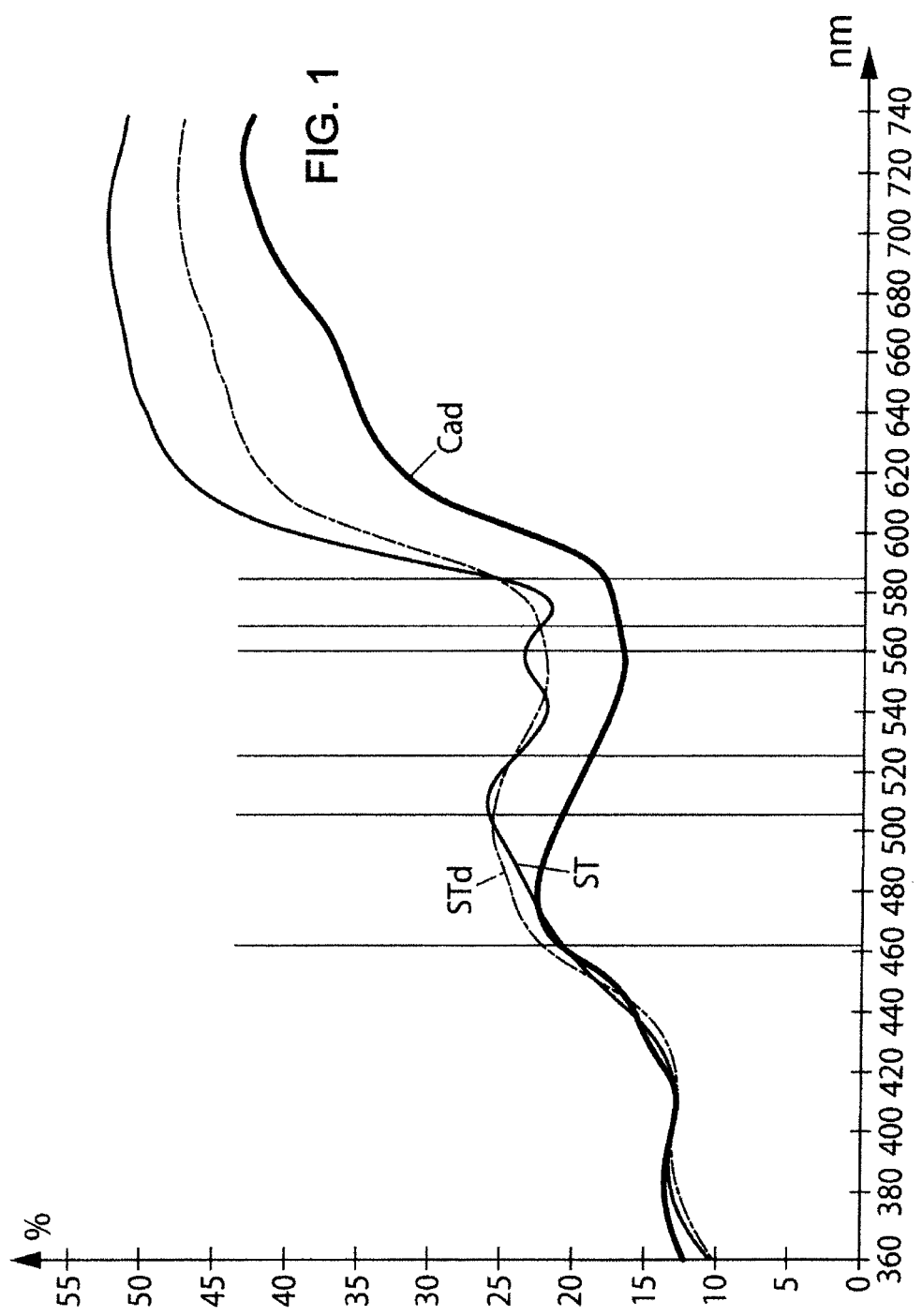
FIG. 1 is a graph in which the curves of the reflection rate (expressed as a percentage, on the Y axis in linear scale mode) of an electromagnetic radiation respectively for a standard living tissue (ST), for a living tissue after application of a tourniquet for one minute (STd), and for a cadavre (Cad), according to the wavelength (in nanometers nm) of the radiation (on the X axis, in linear scale mode) are illustrated.

In FIG. 1, the curve "ST" represents, according to the wavelength of an incident electromagnetic radiation in a range of wavelengths between 360 nm and 740 nm, the reflection rate (as a percentage of the incident power) of an electromagnetic radiation for a standard living tissue.

In FIG. 1, the curve "STd" represents, according to the wavelength of an incident electromagnetic radiation in a range of wavelengths between 360 nm and 740 nm, the reflection rate (as a percentage of the incident power) of an electromagnetic radiation for a living tissue after application of a tourniquet for one minute.

In FIG. 1, the curve "Cad" represents, according to the wavelength of an incident electromagnetic radiation in a range of wavelengths between 360 nm and 740 nm, the reflection rate (as a percentage of the incident power) of an electromagnetic radiation for a cadavre.

Figure 2:
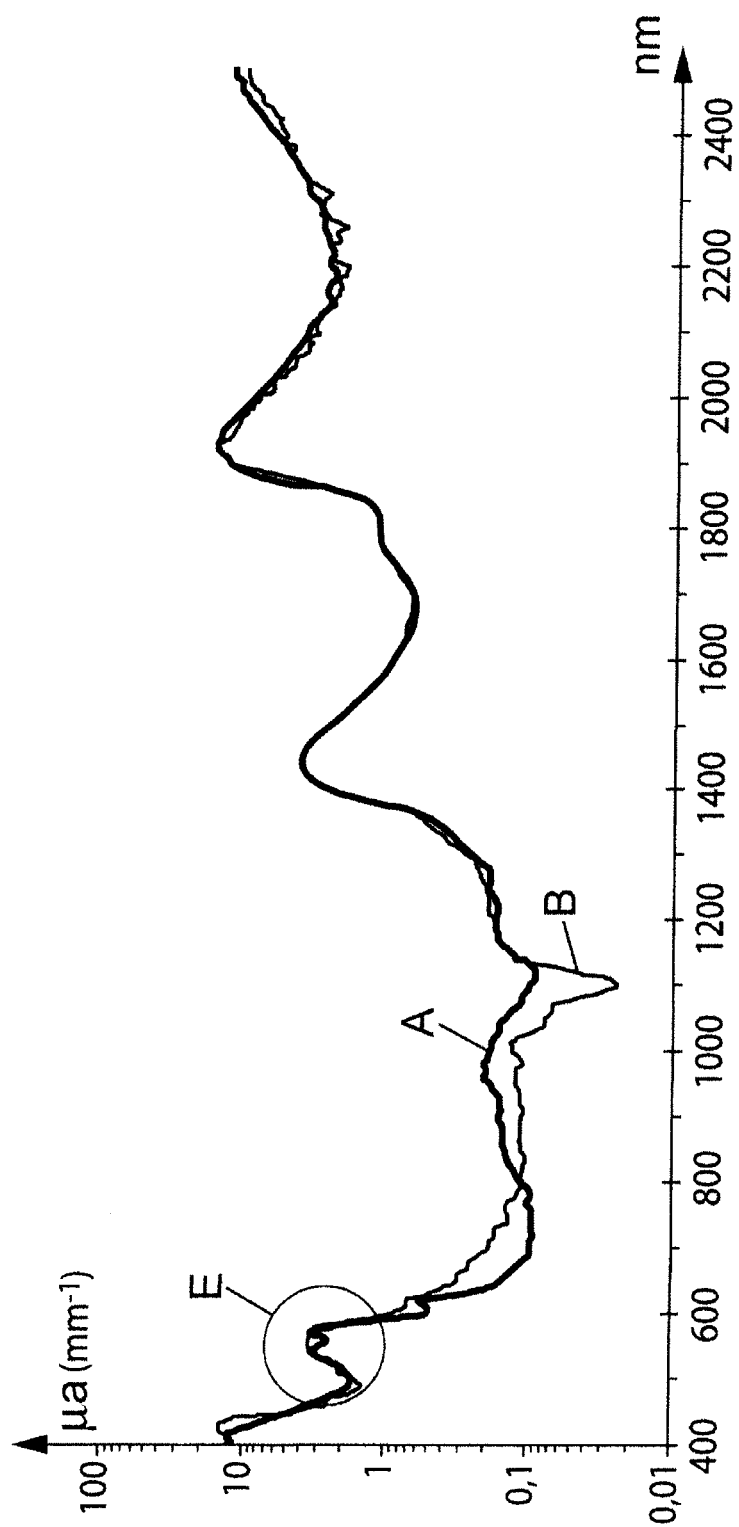
FIG. 2 is a graph in which the two curves of the absorption coefficient of an electromagnetic radiation respectively by 100% oxygenated hemoglobin and 100% deoxygenated hemoglobin, for wavelengths (in nanometers nm) of the radiation, on the X axis in linear scale mode, that are between 400 nm and 2400 nm are illustrated, the optical absorption coefficient ($\mu a$ in $mm^{-1}$) of the illuminated tissue being marked on the Y axis in logarithmic scale mode.

In FIG. 2, the curve A plotted as a thick line represents, according to the wavelength of an incident electromagnetic radiation in a range of wavelengths between 400 nm and 2400 nm, the absorption rate of a sample of hemoglobin only, diluted in water to 300 mosmol per liter and 100% oxygenated.

In the same FIG. 2, the curve B plotted by a fine line represents, in the same range of wavelengths, the absorption rate of a sample of hemoglobin only, diluted in water to 300 mosmol per liter and 100% deoxygenated.

It is known in the medical field that hemoglobin is one of the main absorbents of light by the blood and thereby by the living tissues; the differences between the curves A and B produced with hemoglobin diluted in water but with no other biological constituent therefore illustrate the ranges of wavelengths for which the differences and their direction according to the oxygenation and the deoxygenation of the hemoglobin will be found by reflection on a complete tissue. It will be noted that the two curves A and B are separate from one another, in a more or less pronounced way depending on the wavelength, over the entire range of wavelengths taken into consideration. More particularly, a distinct zone will be noted, for which, at a given wavelength, the proportion of absorbed light is predominant for oxygenated hemoglobin (from 800 to 1150 nm) and a point for which, at a given wavelength, the proportion of absorbed light is done so predominantly for the deoxygenated hemoglobin (600 to 800 nm). Similarly, for a restricted range of wavelengths close to 560 nm, the oxygenated hemoglobin absorbs the radiation predominantly in the deoxygenated hemoglobin and with variations and inversions of differences at wavelengths (542 nm, 560 nm, 576 nm) that are specific to this compound and that will be found through the complete tissue.

It therefore seems possible, in theory, by verifying that it does indeed contain hemoglobin and that there is a proportion, compatible with the physiology of the living person, of oxygenated hemoglobin and deoxygenated hemoglobin, to distinguish a living tissue from a dead or synthetic tissue by a simple measurement of the absorption rate of the illuminated tissue using radiations of appropriate wavelengths.

The ratio of absorption rates, representative of the oxygenation rate and of the local deoxygenation of the hemoglobin can, however, vary, but within a certain limited range, for a living tissue, from one individual to another, even from one position to another on the body of one and the same individual.

However, certain tissue constituents, in particular the pigmentation of the skin (melanin) can notably disturb such a measurement by absorbing the light even before it reaches the capillaries and therefore the hemoglobin. Because of this, in a concrete manner, for the range of wavelengths from 800 to 1150 nm, a strict and reliable differentiation of the absorption rates respectively of the living tissues and non-living tissues is more difficult to perform in the context of a simple method that is quick and universal to implement.

Figure 6:
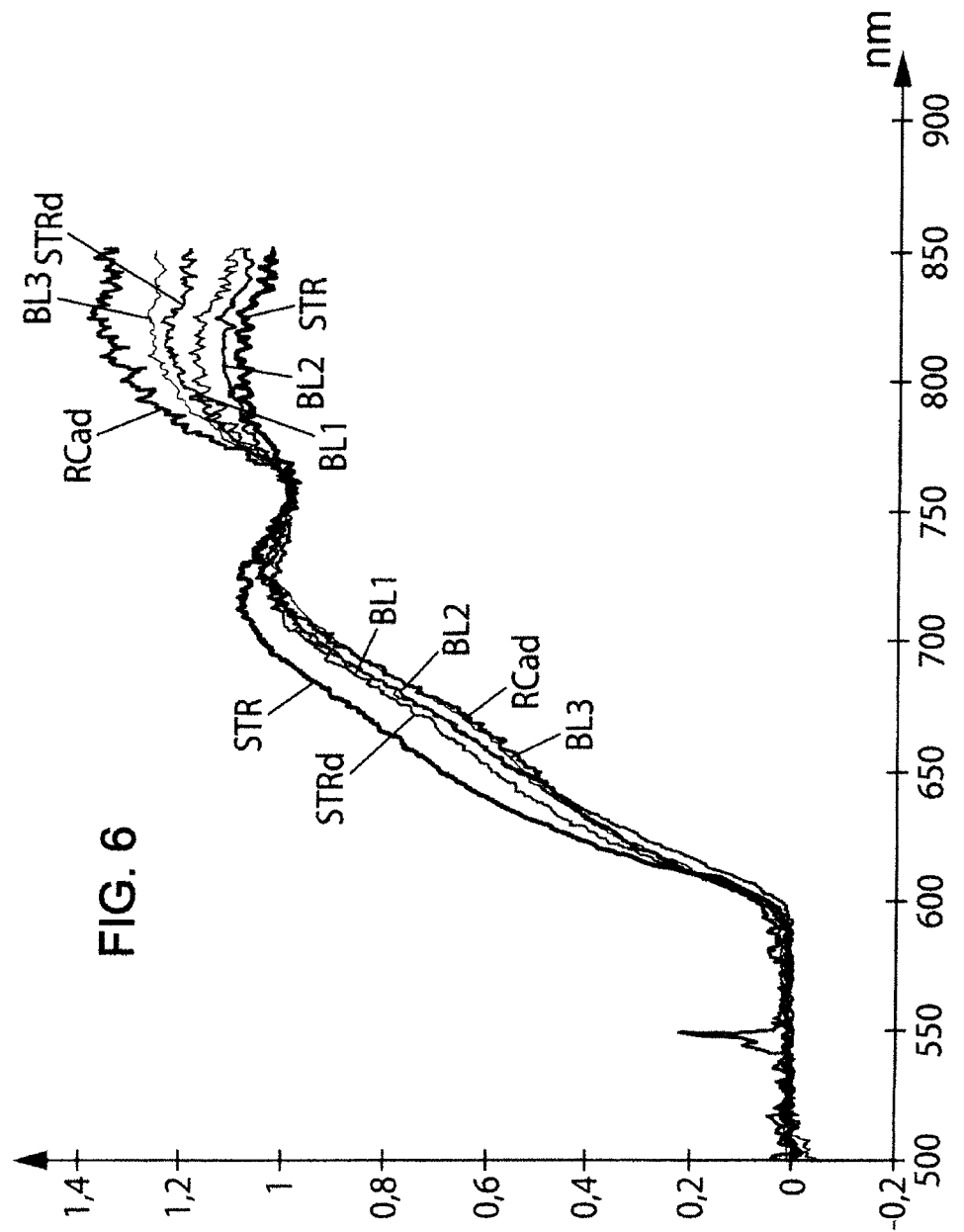
FIG. 6 is a graph in which the curves of the transmission rate (Y axis) of an electromagnetic radiation respectively for a little-pigmented standard living tissue (STR), for a little-pigmented living tissue after application of a tourniquet for one minute (STRd), for a cadavre (RCad), and for tissues with stronger pigmentations (BL1, BL2, BL3) according to the wavelength (in nanometers nm) of the radiation (X-axis, in linear scale mode) in the range 500-900 nm are illustrated (measurements carried out at an ambient temperature of 22° C.±2° C. (6° C.±2° C. for the cadavre)).

However, the higher the wavelength used to measure the reflection in the area where the influence of the oxygenated hemoglobin is predominant (>800 nm) becomes, the better the performance will be because the radiation is less absorbed before or after having reached the hemoglobin (as emerges from the curves of FIG. 6).

On the contrary, even though the measurement by light reflection is often difficult to perform for certain categories of people or tissues because of the disturbances from other components of the tissue, the real local oxygenation ratio of the hemoglobin remains within the limited range of values compatible with the living organism within the tissue.

It is therefore in this context that the invention proposes an improved method of validating biometric capture, in particular body print capture of an area of the body, notably a fingerprint, of an individual. The method exploits the noteworthy characteristics indicated above making it possible to distinguish a tissue fed with oxygenated blood and whose cells locally consume this oxygen (qualified as living tissue) from a tissue that is not fed by oxygenated blood whose cells have continued to consume oxygen (non-oxygenated tissue: dead tissue, for example an amputated finger or cardiac arrest) or which is badly fed with oxygenated blood and for which the oxygen consumption of the cells remains of the same order (sclerosed tissue, ligatured finger for example), or even which is overoxygenated (synthetic finger made to respond favorably to the wavelengths of oxygenated hemoglobin only), the latter being qualified as non-living tissue.

The method according to the invention consists in that, in the area of the body provided with the biometric characteristic to be detected, in parallel with the biometric capture proper:

said area of the body is illuminated using at least one radiation including at least two different respective wavelengths between about 500 nm and 1150 nm, at least two reflectometry measurements are carried out in relation to said at least two different respective wavelengths between about 500 nm and 1150 nm, to measure the reflection rate of the tissues of said body area for said at least two wavelengths, the ratio of these two measured rates is calculated, and the duly calculated ratio is compared to an interval of reference values characterizing a living tissue for the wavelengths concerned.

Thus, if said ratio is included within said interval, said area of the body is considered to be living and the biometric capture can be validated. However, if said ratio is not included within said interval, said area of the body is considered not to be living and the biometric capture may not be validated.

It is possible to envisage several solutions for carrying out the reflectometry measurements required by the method that has just been described.

A first solution can consist in illuminating the body area with radiations having the required wavelengths and in conducting the reflectometry measurements on the respective reflected radiations; in other words, in this case, said area of the body is illuminated using at least two radiations including said at least two different respective wavelengths and at least two reflectometry measurements are carried out in relation to said at least two different respective wavelengths to measure the reflection rate of the tissues of said body area for said at least two wavelengths.

However, it is also possible to envisage another solution which consists in illuminating said area of the body using a radiation including said at least two different respective wavelengths, in filtering from the reflected radiation the at least two reflected radiations having said at least two wavelengths, and in carrying out at least two reflectometry measurements aligned on said at least two different respective wavelengths to measure the reflection rate of the tissues of said body area for said at least two wavelengths. In this case, the isolation of the radiations having the required wavelengths is performed on the reflected radiations, by optical filtering for example, whereas the incident radiation with which the tissue is illuminated can present a wide spectrum of wavelengths (use of white light for example).

In a first practical implementation of the invention, reference is made to a noteworthy characteristic of the graph of FIG. 2 underscored above: the offset of the two curves A and B is notable in a range of wavelengths between about 600 nm and 1150 nm, whereas the offset is far less outside this range, even almost zero beyond 1400 nm: because of this implementing the provisions of the invention outside the above-mentioned range, although possible in principle, would raise technical difficulties.

Figure 3:
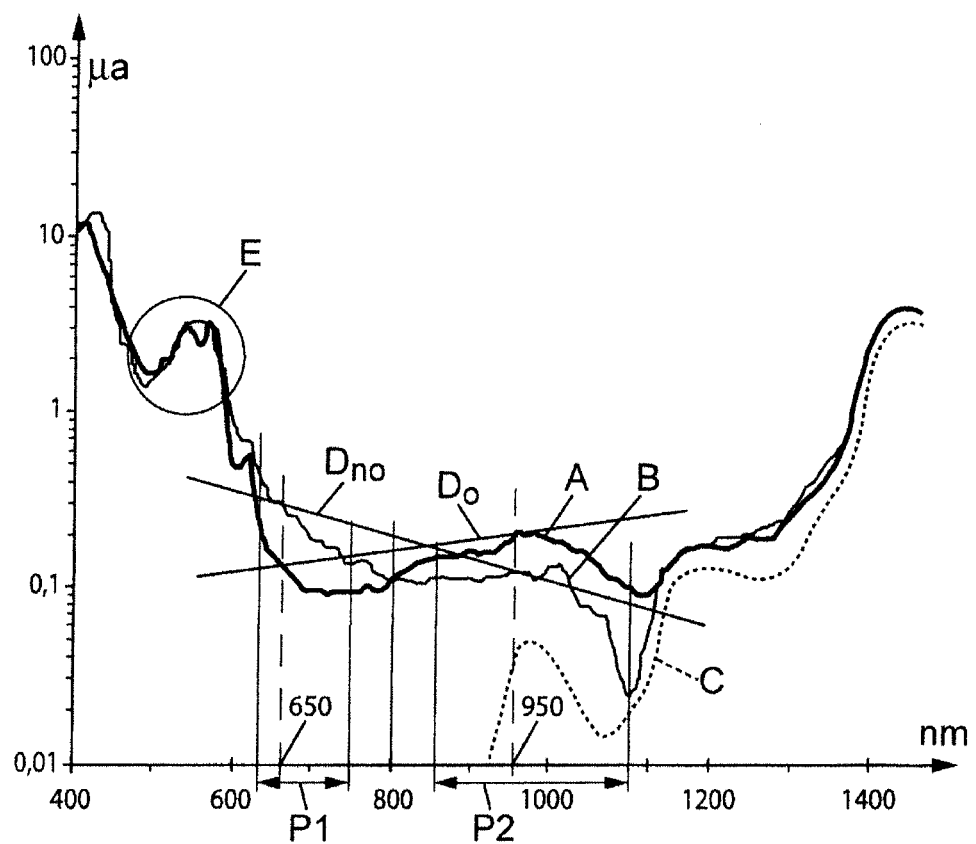
FIG. 3 is an enlarged scale view of a portion of the graph of FIG. 2 for wavelengths between 400 nm and 1400 nm, useful for understanding a first implementation of the method according to the invention.

Referring more specifically to FIG. 3 which represents in larger scale the portion of the graph of FIG. 2 between about 600 nm and 1150 nm, an intersection of the curves A and B will be noted in the vicinity of 800 nm: for wavelengths less than 800 nm, the curve A is situated below the curve B (the absorption rate of the oxygenated hemoglobin for these wavelengths is less than the absorption rate of the non-oxygenated hemoglobin), whereas, for the wavelengths greater than 800 nm, the curve A is situated above the curve B (the absorption rate of the oxygenated hemoglobin for these wavelengths is greater than the absorption rate of the oxygenated hemoglobin).

FIG. 3 also represents, by a dotted line, in the same range of wavelengths, curve C representing the absorption rate of pure water, which serves as a reference and which gives the indication that, from about 1200 nm, the diluted hemoglobin sample represents a reflection rate close to that of pure water. It is therefore the water that becomes the main reflecting component of the blood from about 1200 nm and, consequently, the differences of reflectance (or reflection rate) between oxygenated hemoglobin and non-oxygenated hemoglobin will be more difficult to measure by measuring the reflection rate through the tissue above 1200 nm.

In these conditions, it is proposed to use two substantially monochromatic radiations having different respective wavelengths between about 600 nm and 1150 nm and situated either side of about 800 nm.

Preferably, to obtain clearly differentiated measurement results, it is desirable for the radiations used to correspond to the greatest differences that exist between the two curves A and B, that is, as can best be seen in FIG. 3, in a range P1 between about 620 nm and 750 nm for the first wavelength of a first radiation and in a range P2 between about 850 nm and 1100 nm for the second wavelength of a second radiation.

Typically, the first and second radiations can respectively have a first wavelength of about 650 nm (red light) and a second wavelength of about 950 nm (near infrared), bearing in mind that optoelectronic hardware is commonly available on the market (and is therefore relatively inexpensive) for these two wavelengths.

In FIG. 3, the two straight lines Do and Dno joining the two measurement points for these two wavelengths are plotted respectively on the curve A (100% oxygenated hemoglobin) and on the curve B (100% deoxygenated hemoglobin). It is noted that the two straight lines Do and Dno present notably different slopes (and in addition slopes of opposite signs in this concrete case). The two straight lines Do and Dno represent two extremes that are never reached in practice, since a living tissue contains a mixture of oxygenated hemoglobin and deoxygenated hemoglobin: in practice, the measurements carried out on a living tissue lead to a ratio reflecting the slope of a straight line that is situated between the abovementioned straight lines Do and Dno. Also, the selection sought based on the calculation of the indicated ratio constitutes a reliable criterion.

The abovementioned ratio of the two measured rates is compared to an interval of values from about 0.48 to 0.60 which characterizes a living organism for abovementioned wavelengths of 650 nm and 950 nm.

The first possible implementation of the method according to the invention that has just been explained is of great interest for the quality of the results obtained and for the technical simplicity with which it can be physically realized. However, the security level regarding frauds of the false finger type is not optimum because of the relatively great difference between the two wavelengths (typically 650 nm and 950 nm in the abovementioned example) that are used. In practice, even if such a fraud uses particular techniques that are reserved for experts, it is not impossible to envisage the production of a false body area such as a false finger made of a material or coated with a material or materials that confer the required absorption rates for the two wavelengths used (for example 650 nm and 950 nm), given the relatively great difference between these two wavelengths.

Figure 4:
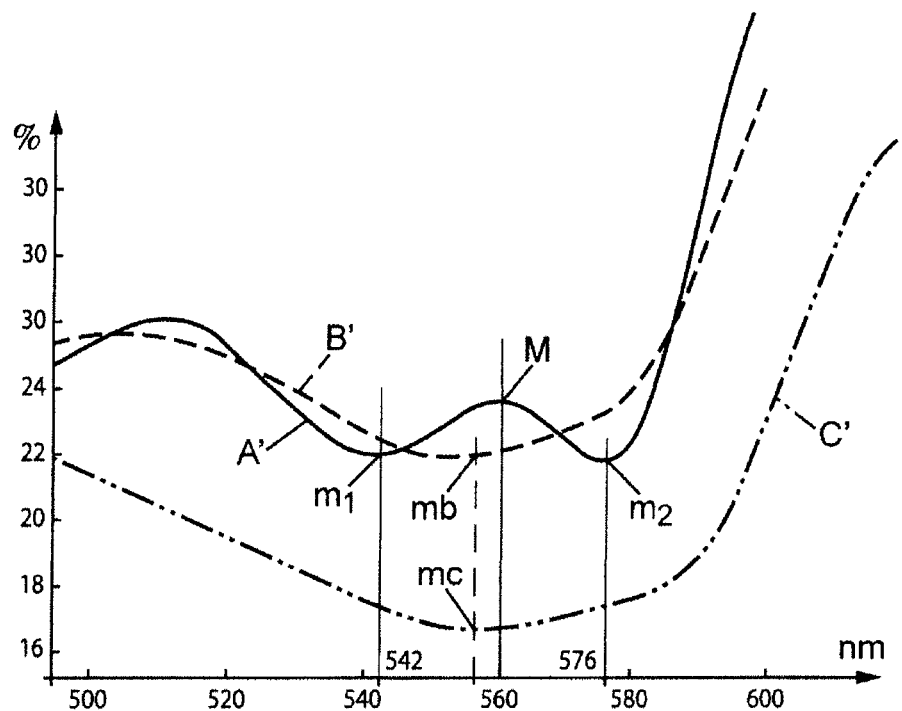
FIG. 4 is an enlarged scale view of a portion of the graph of FIG. 1 for wavelengths between 500 nm and 600 nm, useful for understanding a second implementation of the method according to the invention.

It is notably in consideration of this inadequacy of the first implementation proposed above that the invention proposes another implementation that is based on the portion of the curves A and B of the properties of hemoglobin only, designated III in FIGS. 2 and 3, and that is reflected on complete tissue in FIG. 1 and represented in even larger scale in FIG. 4. It will be noted that, in FIG. 4, it is the reflection rate or reflectance that is given on the Y axis, and not the absorption as in FIGS. 2 and 3, such that the curves represented in FIG. 4 are inverse in relation to the respective ones of FIGS. 2 and 3.

FIG. 4 shows the particular approximately W-form of the reflectance curve A' (the strong solid line) of a normally oxygenated living tissue between the wavelengths of about 510 nm and 620 nm, with three characteristic points, namely a relative maximum M for the wavelength of about 560 nm framed by two relative minimums m1 and m2 for wavelengths of about 542 nm and 576 nm respectively. However, in this same range of wavelengths, the reflectance curve B' of a badly- or non-oxygenated tissue presents the general appearance of a U which has a relative minimum mb for a wavelength of about 555 nm and for which the slopes either side of this relative minimum differ substantially from the slopes of the extreme arms of the W formed by curve A'.

In this same FIG. 4, a curve C' is shown, representing the reflectance of a dead tissue (cadavre), representative, for example, of an amputated finger. This curve C' is highly offset downward (very low reflectance rate) and presents a generally U-form with a relative minimum mc for a wavelength of about 555 nm.

Finally, it will be noted that the particular W-form of the curve A' extends over a range of wavelengths that is relatively narrow, and that, in this range, there are three characteristic points m1, M and m2 of the curve A' as well as slopes that are also characteristic which all are respectively distinguished from the unique characteristic point and from the slopes of the curve B' and from those of the curve C', which should notably complicate, even render almost impossible, for fraudsters, the production of a false body area combining all these precise characteristics.

In this context, in a second practical implementation of the invention, it is proposed that the abovementioned at least two reflectometry measurements be carried out using at least two radiations of different respective wavelengths between about 510 nm and 620 nm.

To apply the above provisions in a concrete manner in relation to the presence of the abovementioned three characteristic points, the following is proposed (see FIG. 4):

three measurements are carried out respectively using three radiations having different respective wavelengths, a first radiation having a first wavelength of about 542 nm, a second radiation having a second wavelength of about 560 nm and a third radiation having a third wavelength of about 576 nm, three ratios of said three measurements taken in pairs are calculated, and these three ratios are compared respectively with three reference value intervals, these three ratios needing to have values included in the three respective intervals for the body area subjected to the examination to be considered to be living.

Figure 5:
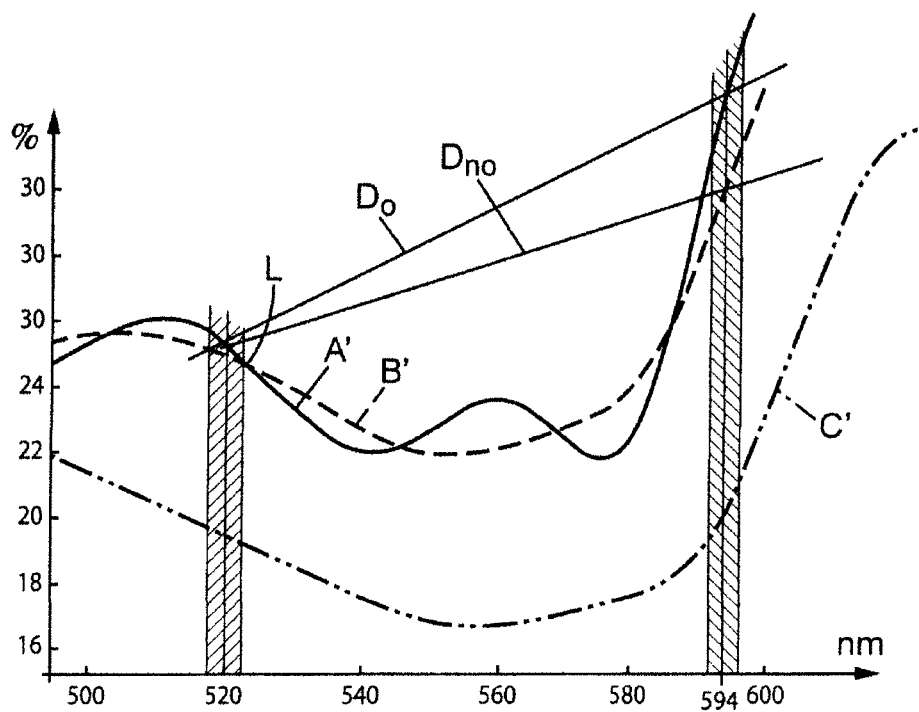
FIG. 5 is an even larger scale view of a portion of the graph of FIG. 1 for wavelengths between 500 nm and 600 nm, useful for understanding a variant of the second implementation of the method according to the invention.

Considering FIG. 4, it will be noted that the straight lines defined by the respective pairs of points m1M, Mm2 and m1m2 on the curve A' present slopes that are very different from the slopes of the respective three straight lines passing through the corresponding pairs of points taken on curve B' (these straight lines are not plotted in FIG. 5 in order to retain legibility for this FIG. 5). Thus, the three ratios of said three measurements taken in pairs, which reflect the slopes of the abovementioned three straight lines, have values that are notably different depending on whether the measurements have been carried out on a living tissue (containing hemoglobin and in proportions of its oxygenated and non-oxygenated form that are characteristic of living tissue) or on a non-living tissue: badly- or non-oxygenated (dead tissue for example) or over-oxygenated or even not containing hemoglobin (synthetic finger for example), such that the selection sought can be performed reliably.

However, the practical implementation risks coming up against a difficulty from the fact that substantially monochromatic light sources emitting these wavelengths are not common or have to be made up of several devices and are therefore costly, which constitutes a handicap in producing a device at low cost.

To overcome this difficulty, there is proposed a variant implementation of the above provisions (see FIG. 5) which consists in having two reflectometry measurements carried out using at least one first radiation covering a first range of wavelengths centered on a first wavelength between about 510 nm and 542 nm and a second radiation covering a second range of wavelengths centered on a second wavelength between about 576 nm and 620 nm. The first wavelength is preferably chosen to be as close as possible to the intersection L of the two curves A' and B', so that the difference between the "living" and "non-living" slopes is maximum over the entire wavelength range of this source, whereas the second wavelength is preferably chosen from a region where the two curves A' and B' present a difference that is as great as possible over the wavelength range of this source, typically towards 600 nm: there is then an assurance of any notable difference between the values of the ratios calculated respectively with measurements carried out on a living tissue (containing hemoglobin and in proportions of oxygenated and non-oxygenated forms that are characteristic of the living tissue) and with those carried out on a non-living tissue (badly oxygenated, non-oxygenated, over-oxygenated or not containing hemoglobin); the selection criteria are then unambiguous.

Advantageously, it is possible then to provide for the first radiation to be centered on a first wavelength of about 520 nm and notably cover a range of about ±33 nm either side of this first central wavelength. It is also possible to provide for the second radiation to be centered on a second wavelength of about 594 nm, and notably to cover a range of about ±15 nm either side of this second central wavelength.

As an example, it can be mentioned that the ratio of the reflectometry measurements carried out for wavelengths of 520 nm and 594 nm is of the order of 0.29 for a normal living finger, of the order of 1.02 for a highly pigmented living finger, of the order of 1.14 for a tourniqueted living finger, of the order of 1.31 for a cadavre and of the order of 1.30 for a highly pigmented cadavre.

Again by way of example, it can also be mentioned that the ratio of the reflectometry measurements carried out for wavelengths of 464 nm and 594 nm is of the order of 0.87 for a normal living finger, of the order of 0.80 for a highly pigmented living finger, of the order of 0.98 for a tourniqueted living finger, of the order of 1.35 for a cadavre and of the order of 1.20 for a highly pigmented cadavre.

FIG. 5 shows the straight line Do joining the measurement points on the curve A', the slope of this straight line Do reflecting the ratio of the two measurements carried out on a living tissue, that is, containing hemoglobin and in its oxygenated and non-oxygenated forms in proportions compatible with living tissue. Also represented is the straight line Dno joining the measurement points on the curve B', the slope of this straight line Dno reflecting the ratio of the two measurements carried out on a dead tissue or tissue with a blood circulation being stopped. It will be noted in FIG. 5 that the two straight lines Do and Dno present notably different slopes, reflected by respective measurement ratio values that are notably different. These slopes correspond to the ideal case of almost monochromatic sources. The use of sources offering a small spread of wavelengths as stated hereinabove (for example ±33 nm and ±15 nm) makes it possible to further amplify the differences observed between living and non-living tissue, and therefore further consolidate the validity of the ratio in a single measurement for each of the light sources.

To complement the information and obtain additional security, consideration may be given to carrying out a third measurement using a radiation having a third intermediate wavelength, for example situated in the vicinity of 560 nm, in order either to locate an intermediate characteristic point, or to determine an intermediate additional slope.

In the context of the invention, the measurements carried out are rapid, almost instantaneous, and are accompanied by no other additional measurement relating to another criterion; the determination of their ratio and the positioning of this ratio with respect to a reference value or interval are information processing steps that can, once again, be carried out extremely rapidly. It is therefore easy to include such a method in the context of a print capture without a significant hindrance for the user resulting therefrom.

An important advantage of the method according to the invention lies in the fact that it uses measurements conducted at depth in an area of the body, and not on the surface as is the case with the methods that use surface characteristic measurements, which complicates the fraud attempts and therefore constitutes an additional security criterion.

It will also be noted that the method according to the invention is compatible with the techniques of contactless capture for body areas (prints or face for example), which makes it possible to widen their field of implementation.

The practical conditions for implementing the various aspects of the method according to the invention are numerous, which allows for easy adaptation to the imperatives of various applications.

Thus, depending on the requirements, it is possible to provide for the radiations having different wavelengths to be point shaped, but it is also possible to ensure that they are surface radiations overall, over the entire surface of the capture or even in a predetermined limited manner.

In the case of a spot pattern or a set of defined points, the capture can be carried out with a spot light sensor or a set of spot light sensors, as known in the state of the electronic art (photodiode, photo transistor, for example).

For all the sequences and all the types of lighting (spot, global or patterned), the use of a two-dimensional image sensor as known in the state of the electronic art (CCD, CMOS camera for example) it is advantageously possible to allow for all the measurements to be acquired in a single image or image portion capture or in two image or image portion captures.

The calculation of the ratio as defined above in the context of the invention at several points (pattern or overall surface) of the area to be analyzed makes it possible to consolidate the measurements in several areas or carefully chosen points in order to counter fraud attempts that are one-off or based on association of elements.

The pattern, the overall surface or the point used for this calculation can be chosen a priori or a posteriori according to criteria calculated after the capture (for example analysis of the image of a print so as not to carry out the calculation on the background of the image not covered by the finger).

The consolidation between different points can also take the form of an average of the ratios.

The consolidation between different points can also take the form of comparison of the number of points designated as living with the number of points designated as non-living raised to the scale of the number of points covered by the print, associated with an analysis of their spatial distribution. It is, for example, interesting to designate as nonliving a biometric capture for which the relative number of points designated as non-living is greater than a threshold and their surface distribution is contiguous (excessively large non-living associated component even if other points are designated as living).

Moreover, the measurements carried out with respective radiations at different wavelengths can be performed successively, with the same hardware, by switching over two light sources, which makes it possible to reduce the bulk and the cost of the hardware needed for this additional function. However, if necessary, it is also possible to envisage having the measurements carried out in a manner offset in time with respective radiations having different wavelengths that are emitted in a manner offset in time.

Furthermore, it is also possible to envisage having the measurements carried out simultaneously, but on points, patterns or surfaces that are very slightly offset in space with respective radiations having different wavelengths and which are emitted simultaneously in time.

Thanks to the method according to the invention, it is possible to determine if the area of the body subjected to the print capture process is living, after which the print capture can be validated, or even if said area of the body is not living, after which the print capture may not be validated. The implementation of the provisions of the invention can give rise notably to miscellaneous variant embodiments. Some examples are given hereinbelow.

According to a first possible variant, the print capture and the double reflectometry measurement are carried out simultaneously, obviously provided that there is no interference between the two operations in particular regarding the wavelengths of the radiations used; once the abovementioned ratio is established and compared to the value or to the reference interval held in memory, the print capture is validated or invalidated after the body area has been declared living or non-living respectively. This implementation offers the benefit of rapidity, such that the inputting of the information does not require a time period greater than that of a single body print capture alone, which constitutes an advantage for the person tested but, on the other hand, this leads to a print capture being carried out that may prove useless.

According to a second possible variant, the double reflectometry measurement and the determination of the living or non-living state of the body area subjected to the analysis are carried out first of all; then, the print capture process is undertaken only if the body area is declared living. This implementation can prove slightly longer than the previous one, but, however, without it resulting in a time period for inputting all the information that may be felt to be excessive by the user. This method presents the interesting advantage of avoiding validating biometric captures on residual plots (of fingers for example), dust, raindrops or miscellaneous compounds. It is highly important in this method to limit the capture time allowed for the print performed after the detection of the living tissue in order to avoid a living tissue being replaced by another object that is non-living but includes the biometric information to be analyzed.

According further to a third variant, provision is made for the following:
the measurements relating to hemoglobin on the body area having to be subjected to a biometric capture and the determination of the living or non-living state of said area are carried out first of all, after which the following step is undertaken only if the body area is declared living,
then, a biometric capture and new measurements relating to the hemoglobin are carried out simultaneously,
after which, the biometric capture can be validated or invalidated depending on whether said body area is once again declared living or non-living respectively.

This third variant combines the previous two: the abovementioned second variant is implemented first so as to undertake the print capture process only if the body area is declared living; then, the abovementioned first variant is implemented in order to check in parallel with the biometric capture that there has been no substitution between the determination of the initial living character and the real capture. This implementation combines the benefits of the first two variants for a minimal increase in operating time.

According to a fourth possible variant, the biometric capture is carried out first of all, then, immediately after, the reflectometry measurements and the determination of the living or non-living state of the body area subjected to the analysis are carried out; after which, the biometric acquisition is validated only if the body area is declared living; this implementation presents the interesting benefit of making it possible to have information on the living or non-living status with certainty that there has been no substitution between the biometric capture and the determination of the living status, because the time period between said biometric capture and said determination of the living status is then reduced to a minimum.

According to a fifth possible variant and one that is currently preferred, provision is made for the following:
the reflectometry measurements on the body area having to be subjected to a biometric capture and the determination of the living or non-living state of said area are carried out first of all, after which the following step is undertaken only if the body area is declared living,
then, a biometric capture is carried out,
then, immediately after, new reflectometry measurements are carried out,
after which, the biometric capture can be validated or invalidated depending on whether said body area is once again declared living or non-living, respectively.

This fifth variant combines the preceding second and fourth variants: the abovementioned second variant is implemented first of all so as to undertake the print capture process only if the body area is declared living; then, the abovementioned fourth variant is implemented in order to verify the living status of the object immediately after the biometric capture; after which, the biometric acquisition is validated only if the body area is once again declared living; this implementation combines the benefits of the second and fourth implementations without notably increasing the overall implementation time of the method.

According to a sixth possible variant, which combines any two or three of the preceding first, second and fourth variants, the benefits of the different variations retained are combined by performing only a single biometric capture, but by validating at multiple moments during the capture that the object is still declared living.

The invention claimed is:

1. A method of validating biometric capture, in particular body print capture from an area of the body, in particular a fingerprint or face print, of an individual, wherein, in the area of the body provided with the biometric characteristic to be detected, the method comprising:
    illuminating said area of the body using at least a radiation including at least two different respective wavelengths between about 500 nm and 1150 nm,
    carrying out at least two reflectometry measurements in relation to said at least two different respective wavelengths between about 500 nm and 1150 nm, wherein it comprises the following steps
        measuring a first reflection rate of the tissues of said body area at a first wavelength, said first reflection rate being the reflected power divided by the incident power,
        measuring a second reflection rate of the tissues of said body area at a second wavelength, said second reflection rate being the reflected power divided by the incident power,
        calculating the ratio of the first reflection rate and the second reflection rate, and
        comparing the calculated ratio with an interval of reference values of the proportion of oxygenated hemoglobin relative to the deoxygenated hemoglobin, said interval of reference values characterizing a living tissue for the wavelengths of said radiation with which said area of the body has been illuminated,
    whereby, if said calculated ratio is within said interval, said area of the body is considered to be living and the biometric capture can be validated, or, if said calculated ratio is not within said interval, said area of the body is considered not to be living and the biometric capture may not be validated.

2. The method as claimed in claim 1, wherein said area of the body is illuminated using at least two radiations including said at least two different respective wavelengths, and wherein at least two reflectometry measurements are carried out in relation to said at least two different respective wavelengths to measure the reflection rate of the tissues of said body area for said at least two wavelengths.

3. The method as claimed in claim 1, wherein said area of the body is illuminated using a radiation including said at least two different respective wavelengths, wherein from the reflected radiation, the at least two reflected radiations having said at least two wavelengths are filtered, and wherein at least two reflectometry measurements aligned on said at least two different respective wavelengths are carried out to measure the reflection rate of the tissues of said body area for said at least two wavelengths.

4. The method as claimed in claim 1, wherein two reflectometry measurements are carried out respectively on two substantially monochromatic reflected radiations of different respective wavelengths between about 600 nm and 1150 nm and are situated either side of a value of about 800 nm.

5. The method as claimed in claim 4, wherein a first wavelength of a first radiation is between about 620 nm and 750 nm.

6. The method as claimed in claim 5, wherein said first wavelength is about 650 nm.

7. The method as claimed in claim 4, wherein a second wavelength of a second radiation is between about 850 nm and 1110 nm.

8. The method as claimed in claim 7, wherein said second wavelength is about 950 nm.

9. The method as claimed in claim 1, wherein said at least two reflectometry measurements are carried out using at least two radiations of different respective wavelengths between about 510 nm and 620 nm.

10. The method as claimed in claim 9, wherein two reflectometry measurements are carried out using at least one first radiation covering a first range of wavelengths centered on a first wavelength between about 510 nm and 542 nm and a second radiation covering a second range of wavelengths centered on a second wavelength between about 576 nm and 620 nm.

11. The method as claimed in claim 10, wherein the first radiation is centered on a first wavelength of about 520 nm.

12. The method as claimed in claim 10, wherein the first radiation is centered on a first wavelength of about 520 nm, and wherein the first radiation covers a range of about ±33 nm either side of this first central wavelength.

13. The method as claimed in claim 10, wherein the second radiation is centered on a second wavelength of about 594 nm.

14. The method as claimed in claim 13, wherein the second radiation is centered on a second wavelength of about 594 nm, and wherein the second radiation covers a range of about ±15 nm either side of this second central wavelength.

15. The method as claimed in claim 10, wherein a third measurement is carried out using a radiation having a third wavelength situated in the vicinity of 560 nm.

16. The method as claimed in claim 1, wherein:
    three measurements are carried out respectively using three radiations having different respective wavelengths, a first radiation having a first wavelength of about 542 nm, a second radiation having a second wavelength of about 560 nm and a third radiation having a third wavelength of about 576 nm,
    three ratios of said three measurements taken in pairs are calculated, and
    these three ratios are compared respectively with three reference value intervals.

17. The method as claimed in claim 1, wherein the radiations having different wavelengths are point radiations.

18. The method as claimed in claim 1, wherein the radiations having different wavelengths are surface radiations over the entire surface.

19. The method as claimed in claim 1, wherein the radiations having different wavelengths are surface radiations according to a predetermined pattern.

20. The method as claimed in claim 1, wherein the radiations having different wavelengths are emitted simultaneously.

21. The method as claimed in claim 1, wherein the radiations having different wavelengths are emitted being offset in time.

22. The method as claimed in claim 1, wherein the biometric capture and the measurements relating to the hemoglobin are carried out simultaneously, then the biometric capture is validated or invalidated depending on whether the body area is declared living or non-living respectively.

23. The method as claimed in claim 1, wherein the measurements relating to the hemoglobin on the body area having to be subjected to a biometric capture and the determination of the living or the non-living state of said area are carried out first of all, after which the biometric capture process is undertaken only if the body area is declared living.

24. The method as claimed in claim 1, wherein:
    the measurements relating to the hemoglobin on the body area having to be subjected to a biometric capture and the determination of the living or non-living state of said area are carried out first of all, after which the following step is undertaken only if the body area is declared living, then, a biometric capture and new measurements relating to the hemoglobin are carried out simultaneously, after which the biometric capture can be validated or invalidated depending on whether said body area is once again declared living or non-living respectively.

25. The method as claimed in claim 1, wherein the biometric capture is carried out first of all, then, immediately after, the reflectometry measurements and the determination of the living or the non-living state of the body area subjected to the analysis are carried out; then the biometric capture is validated or invalidated depending on whether the body area is declared living or non-living, respectively.

26. The method as claimed in claim 1, wherein:

the reflectometry measurements on the body area having to be subjected to a biometric capture and the determination of the living or non-living state of said area are carried out first of all, after which the following step is undertaken only if the body area is declared living, then, a biometric capture is carried out, then, immediately after, new reflectometry measurements are carried out;

after which, the biometric capture can be validated or invalidated depending on whether said body area is once again declared living or non-living, respectively.

* * * * *